United States Patent [19]

Itou et al.

[11] Patent Number: 4,764,259

[45] Date of Patent: Aug. 16, 1988

[54] METHOD FOR PRODUCING A MAGNETIC RECORDING MEDIUM

[75] Inventors: Katsumi Itou; Atsushi Toyoda, both of Hamamatsu, Japan

[73] Assignee: Nippon Gakki Seizo Kabushiki Kaisha, Japan

[21] Appl. No.: 29,627

[22] Filed: Mar. 24, 1987

[30] Foreign Application Priority Data

Mar. 27, 1986 [JP] Japan .................................. 61-069078
Apr. 7, 1986 [JP] Japan .................................. 61-051824

[51] Int. Cl.⁴ .............................................. C25D 7/04
[52] U.S. Cl. .................................................... 204/25
[58] Field of Search .............................. 204/25, 38.3

[56] References Cited

FOREIGN PATENT DOCUMENTS 33381 2/1985 Japan ...................................... 204/25

Primary Examiner—T. M. Tufariello
Attorney, Agent, or Firm—Lerner, David, Littenberg, Krumholz & Mentlik

[57] ABSTRACT

In production of a magnetic recording medium by formation of an anodic oxide layer on an Al or Al-base alloy substrate and preapitation via electrolysis of magnetic substance in pores in the anodic oxide layer, the substrates are mounted at equal intervals to a common combination shaft made up of several components for a compact constructions and uniform electrolytic effect. Preferably, a specified annular region around the center hole of each substrate is sealed against formation of a surface layer.

9 Claims, 4 Drawing Sheets

METHOD FOR PRODUCING A MAGNETIC RECORDING MEDIUM

BACKGROUND OF THE INVENTION

The present invention relates to method for producing a magnetic recording medium, and more particularly relates to improvements in production of a magnetic recording medium such as a magnetic disk by a process including formation of an anodic oxide layer on an Al or Al-base alloy substrate and precipitation via electrolysis of magnetic substance in pores formed in the anodic oxide layer.

Production of a magnetic recording medium by the above-described process is well known from, for example, Japanese Patent Publication No. Sho. 51-21562 and its products are widely accepted as well suited for use in perpendicular magnetic recording system. In the above-described process, the substrate as an electrode is twice subjected to electrolysis and, for this reason, power has to be supplied to the substrate.

To this end, use of an aluminium lead is conventionally employed in general in connection with a doughnut shaped substrate. More specifically, a thin, high purity aluminium lead is attached to the inner or outer periphery of a substrate by welding. A number of substrates are arranged side by side in an electrolytic bath with their aluminium leads being connected to a common power source so as to act as one electrode during electrolysis. The other electrode is formed by counter plates arranged in the electrolytic bath spacedly facing the group of substrates. The electrolytic bath contains oxalic acid or sulfuric acid soultion.

Despite merits derived from use of the aluminium leads, this power supply system is inevitably accompanied by several drawbacks. In order to obtain a uniform covering layer on each substrate, a large distance should be left between the group of substrates and the counter plates thereby inevitably enlarging the size of the electrolytic bath. Such an enlarged size of the electrolytic bath causes increased installation cost and large consumption of the electrolyte. Difficulty in attachment of the aluminium leands and their reliable insulation makes the process quite unsuited for mass-production. After detachment of the aluminium lead, the substrates have to be subjected to removal of welding scars. In addition, when the aluminium lead is attached to the inner periphery of the substrate, a shade in treatment may be left of the covering layer near the spot of the attachment since presence of the aluminium lead tends to bar smooth formation of the covering layer.

With the above-described process, further, the surface of the product, i.e. the magnetic recording material is totally covered by an insulating alumite layer. When electrostatic accumulation occurs on the magnetic recording medium during its usage, total presence of such an insulating alumite layer hinders smooth discharge of electrostatic accumulation since there is no possibility of grounding. Such electrostatic accumulation often causes generation of harsh noises at pick-up by a magnetic head. Generation of such noises is in particular significant and serious when the magnetic recording medium is driven for rotation in a relatively dry environment.

SUMMARY OF THE INVENTION

It is the primary object of the present invention to remove all the troubles encountered in the prior art due to use of aluminium leads for the powder supply in this environment.

It is another object of the present invention to prevent occurrence of electrostatic accumulation on a produced magnetic recording medium even when used in a highly dry environment.

In accordance with the first aspect of the present invention, a plurality of substrates are mounted at equal intervals to a combination shaft made up of several separable components, the combination shaft is connected to a given power source, counter plates are arranged between adjacent substrates surrounding the combination shaft and the combination shaft with the substrates and the counter plate in an electrolytic bath for rotation during electrolysis.

In accordance with the second aspect of the present invention, each substrate is clamped between a pair of holders in a manner such that a specified annular region around its center hole should be covered by opposing end of the holders, the conductive sections of the holders are connected to a given power source and the substrate with the holders is placed in an electrolytic bath facing a counter plate.

DESCRIPTION OF THE PREFERRED EMBODIMENT

Figure 1A:
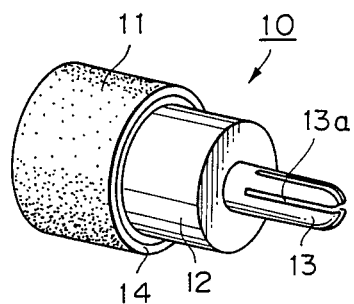
FIGS. 1A and 1B are perspective and side views of one example of the shaft component used for the combination shaft in accordance with the present invention.
Figure 1B:
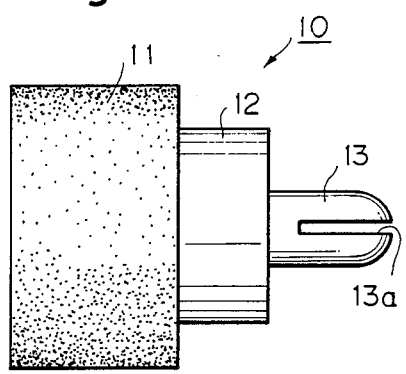
Figure 2:
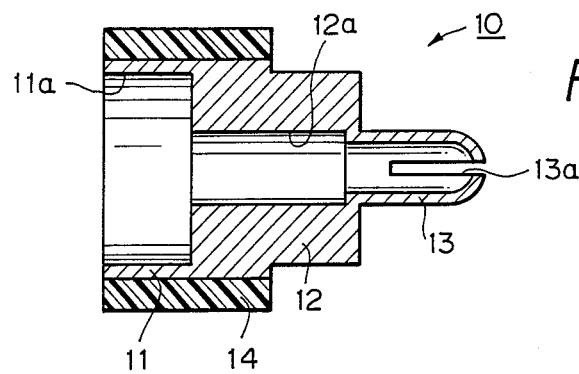
FIG. 2 is a side sectional view of the shaft component.

The method in accordance with the first aspect of the present invention will now be explained in more detail in reference to FIGS. 1A, 1B, 2, 3 and 4. This method is characterized by use of a plurality of shaft components such as shown in FIGS. 1A and 1B. Each shaft component 10 is made up of a rear section 11 of the largest outer diameter, a middle section 12 of an intermediate outer diameter and a front section 13 of the smallest outer diameter. Further, as best seen in FIG. 2, the rear section 11 has an axial bore 11a and covered with a surface layer 14 made of a resilient, insulating material such as rubber. The middle section 12 has an axial bore 12a in axial alignment with the axial bore 11a of the rear section 11.

More specifically, the outer diameter of the rear section 11 is larger than the diameter of the center hole of the substrate to be processed and the length of the rear section 11 is chosen according to the distance to be left between adjacent substrates during electrolysis. The diameter and length of the axial bore 11a of the rear section 11 are large enough to snugly receive the middle section 12. The outer diameter of the middle section 12 is slightly small than the diameter of the above-described center hole of the substrate to be processed. The diameter and length of the axial bore 12a of the middle section 12 are large enough to snugly received the front section 13.

Figure 3:
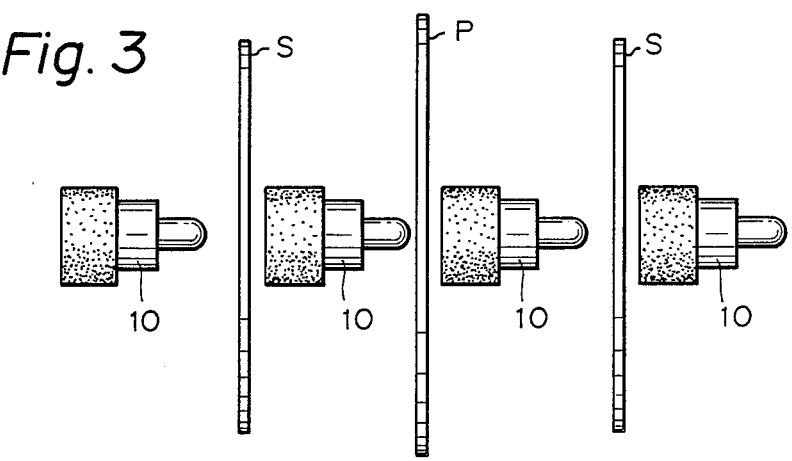
FIG. 3 is a side view for showing formation of a combination shaft from a plurality of shaft component.
Figure 4:
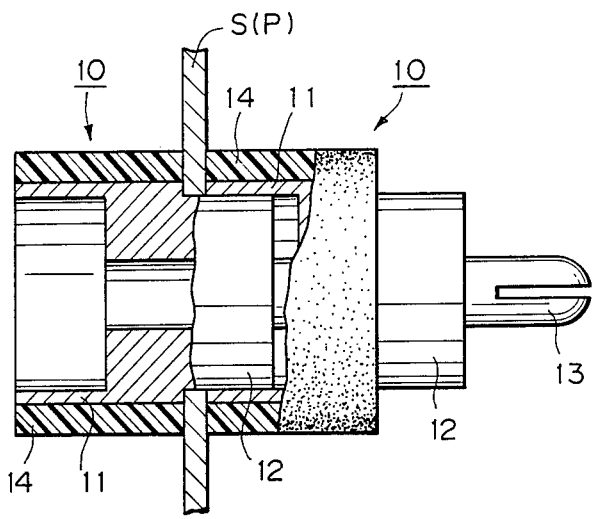
FIG. 4 is a side view, partly in section, of a substrate or a counter plate mounted to the combination shaft.

Before placing in the electrolytic bath, a plurality of shaft components 10 are axially combined to form a combination shaft whilst sandwiching substrates S and counter plates P at alternate positions as shown in FIG. 3. More specifically as best seen in FIG. 4, the middle section 12 of the first shaft component 10 is inserted into the axial bore 11a of the rear section 11 of the second shaft component 10 and a substrate S, or a counter plate P, is inserted over the middle section 12 of the first shaft component 10. Being clamped between the front end of the rear section 11 of the first shaft component 10 and the rear end of the rear section 11 of the second shaft component 10, the position of the substrate S, or the counter plate P, is stably fixed. When counter plates P are held in position by other proper support, only substrates may be clamped in position between adjacent shaft components 10. The front section 13 may be provided with one or more longitudinal slits 13a for leakage of air at combination of the shaft components. When the outer diameter of the front section 13 is designed slightly larger than the diameter of the axial bore 12a of the middle section 12, presence of such longitudinal slits 13a assures stable combination between the adjacent shaft components 10. After combination, the combination shaft with the substrates and the counter plates is placed in position in an electrolytic bath.

In accordance with this embodiment of the present invention, the distance between the adjacent substrate and counter plate can be exactly and easily set only through axial combination of the shaft components in order to assure uniform layer thickness on the product. Since the substrates and the counter plates can be collected within a small, limited space, the electrolytic bath can be made very compact in construction. Connection of a number of substrates to a common power source without any use of aluminium leads makes the process quite suited for mass production. The power supply does not need any intervention between the substrates and the counter plates, thereby developing no uneven covering on the product.

Figure 5:
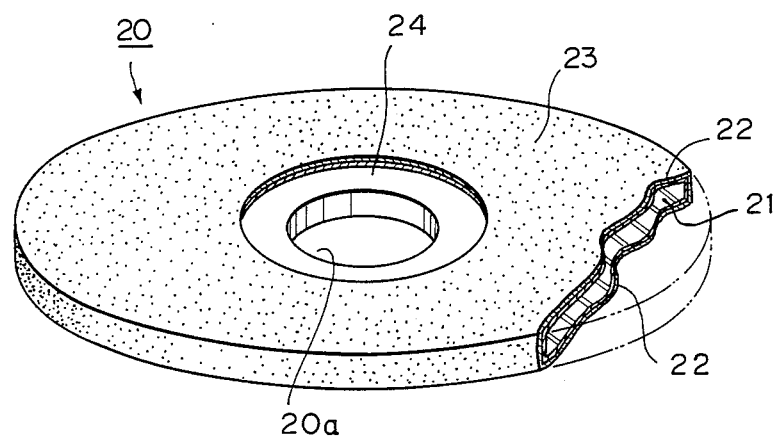
FIG. 5 is a perspective view, partly removed, of one example of the magnetic recording medium produced in accordance with the present invention.

During electrolysis, a specified annular region around the center hole of the substrate is sealed against formation of the covering layers by the ends of the rear sections 11 of the combined shaft components 10 as shown in FIG. 4. One example of the magnetic recording medium so produced is shown in FIG. 5, in which the magnetic recording medium 20 includes a substrate 21, an alumite layer 22 covering the substrate 23 and a magnetic substance layer 23 covering the alumite layer 22. The magnetic recording medium 20 has an uncovered annular region 24 around its center hole 20a through which electrostatic accumulation can be fairly earth discharged.

Figure 6A:
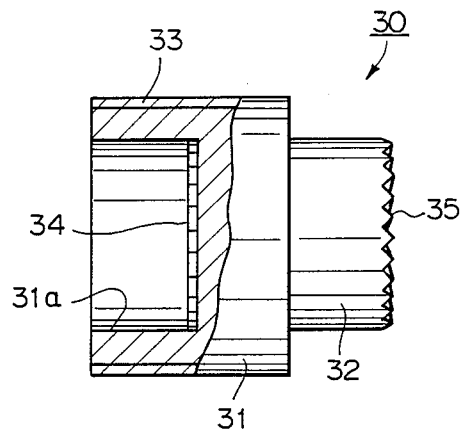
FIGS. 6A and 6B are partly sectional side and front views of another example of the shaft component used for the combination shaft in accordance with the present invention.
Figure 6B:
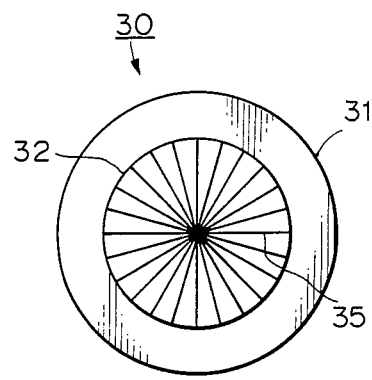

A modification of the shaft component is shown in FIGS. 6A and 6B which is well usable when sealing against formation of the covering layer is not so strictly required. Here the shaft component 30 is made up of a rear section 31 of a larger diameter and a front section of a smaller diameter. The rear section 31 has an axial bore 31a and covered with a surface layer 33 made of an insulating material. The inner end of the axial bore 31a is provided with radial serrations 34 and the front end of the front section 32 is also provided with radial serration 35 meshable with the radial serration 34 in the axial bore 31a.

The outer diameter of the rear section 31 is larger than the diameter of the center hole of the substrate to be processed and the length of the rear section 31 is chosen according to the distance to be left between adjacent substrates during electrolysis. The diameter and length of the axial bore 31a in the rear section 31 are large enought to snugly receive the front section 32. The outer diameter of the front section 32 is slightly smaller than the diameter of the above-described enter hole of the substrate.

Like the foregoing embodiment, a plurality of shaft components 30 are axially combined to form a combination shaft on which each substrate is clamped between adjacent shaft components 30.

Figure 7:
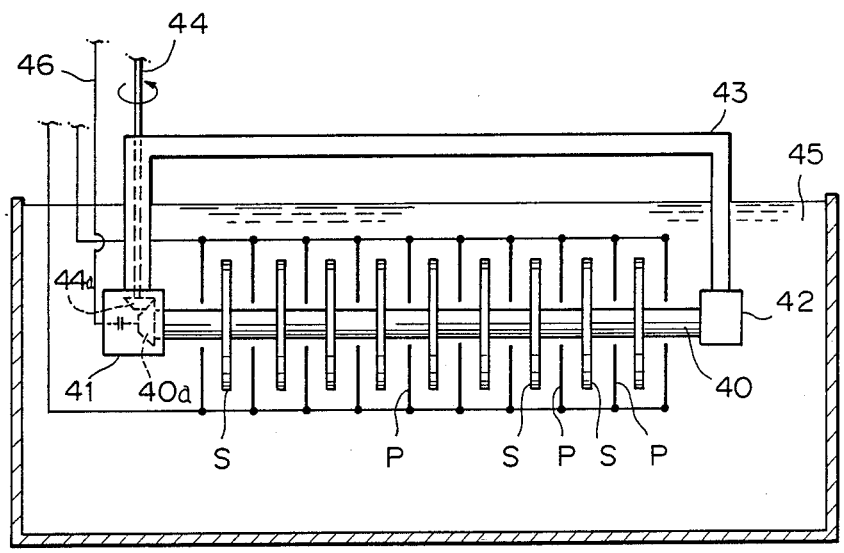
FIG. 7 is a side view, partly in section, of one embodiment of the apparatus carrying out the method of the present invention.

FIG. 7 depicts one example of the electrolytic bath for carrying out the method of the present invention. The combination shaft 40 made up of the shaft components 10 or 30 is placed in position within an electrolytic bath 45 by a hoist 43 via bearing units 41 and 42 with substrates S being equally spaced apart from each other. In this example, counter plates P are arranged apart from the shaft 40 and at alternate positions with the substrates S surrounding the combination shaft 40. In one bearing unit 41, a bevel gear 40a coupled to one end of the combination shaft 40 meshes with a bevel gear 44a coupled to one end of a drive shaft 44 which is coupled for rotation to a given outside drive source (not shown). The combination shaft 40 is further connected to a proper power source (not shown) via a lead 46. Thus, the combination shaft 40 and the substrates S are driven for rotation during electrolysis.

Figure 8:
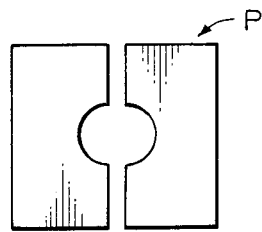
FIG. 8 is a front view of a counter plate advantageously used for combination with the combination shaft.

For easy mounting to the combination shaft 40, the counter plate P may take the form of a split type one such as shown in FIG. 8.

Figure 9:
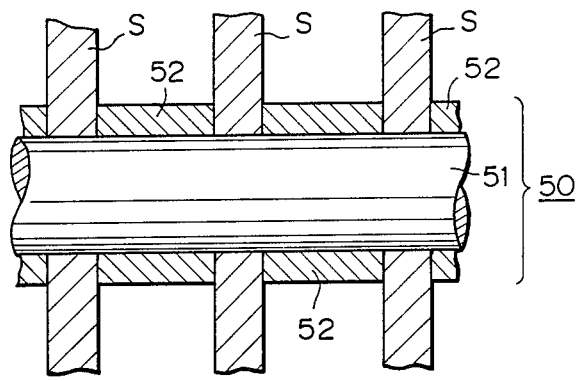
FIG. 9 is a side view partly in section, of another example of the combination shaft in accordance with the present invention.

As a substitute for the axial combination of a plurality of shaft component, a combination shaft 50 shown in FIG. 9 is made up of a monolithic, conductive core 51 and a plurality of insulating sleeve components 52 snugly inserted over the conductive core 51. The outer diameter of the core 51 is slightly smaller than the diameter of the center hole of the substrate to be processed. The length of each sleeve component 52 is chosen in accordance with the distance to be left between adjacent substrates during electrolysis. When mounted to the combination shaft 50, each substrate S is clamped firmly between adjacent sleeve components 52.

Figure 10:
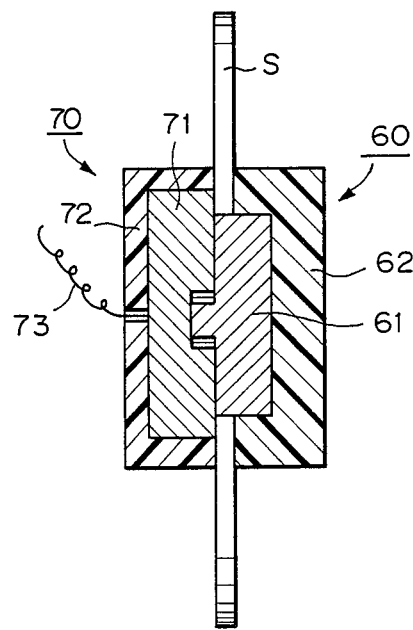
FIG. 10 is a sectional side view of an apparatus for the second embodiment of the present invention.

The method in accordance with the second shaft aspect of the present invention will now be explained in more detail in reference to FIG. 10. This method is suited for the case in which the producer's attention is more focused on formation of the uncovered annular region (see FIG. 5) than compactness in construction due to use of the combination shaft such as shown in FIG. 7. A pair of cylindrical holders 60 and 70 are used for this method. The first holder 60 is made up of a conductive core 61 having a threaded center projection and an insulating sheath 62 embracing the core 61 leaving the side of the center projection. The second holder 70 is made up of a conductive core 71 having a threaded center hole and an insulating sheath 72 embracing the core leaving the side of the center hole, and the core 71 is connectable via a lead 73 to a given power source (not shown). The outer diameters of the holders 60 and 70 are equal to the outer diameter of the uncovered annular region to be formed on the magnetic recording medium (see FIG. 5). The outer diameter of the core 61 of the first holder 60 is slightly small than the diameter of the center hole of the substrate to be processed whereas the outer diameter of the core 71 of the second holder 70 is somewhat larger than the diameter of the above-described center hole. The core 61 of the first holder 60 project from the sheath 62 over a distance roughly equal to the thickness of the substrate.

In assembly, the core 61 of the first holder 60 is inserted into the center hole of the substrate S and the core 71 of the second holder 70 is screwed over the threaded center projection. After setting in a electrolytic bath, the lead 73 is connected to the given power source.

I claim:

1. A method for producing a magnetic recording medium comprising a magnetic substance electrolytically precipitated onto a substrate comprising providing a shaft including a conductive core having an outer surface and a plurality of insulating sections spaced along said outer surface of said conductive core, mounting a plurality of said substrates in predetermined spaced locations along said conductive core whereby said plurality of insulating sections alternate with said plurality of substrates therealong, connecting said conductive core to a power source, arranging said shaft with said plurality of substrates in an electrolytic bath, and providing counter plates corresponding to said substrates in said electrolytic bath.

2. The method of claim 1 wherein said substrate comprises aluminum or an aluminum based alloy.

3. The method of claim 2 wherein said substrate includes an anodic oxide layer thereon including pores, and wherein said method comprises precipitation of a magnetic substance in said pores in said anodic oxide layer.

4. The method of claim 1 wherein said shaft comprises a plurality of shaft members, each or said shaft members including a conductive core section and an insulating section disposed on said conductive core section, and wherein said mounting of said plurality of substrates comprises axially connecting said plurality of shaft components together with said plurality of substrates therebetween.

5. The method of claim 1 wherein said conductive core comprises an elongated cylindrical core, and wherein said plurality of insulating sections comprises a plurality of annular sleeve components adapted to be axially slidable along said outer surface of said conductive core, and further wherein said mounting of said plurality of substrates comprises alternately inserting said plurality of insulating sections and said plurality of said substrates along said conductive core.

6. The method of claim 5 including spacing said plurality of insulating sections and said plurality of substrates along said plurality of shaft components whereby said plurality of substrates is tightly clamped between said plurality of insulating sections of said adjacent ones of said plurality of shaft components.

7. The method of claim 1 wherein said providing of said counter plates comprises mounting said plurality of counter plates along said conductive core alternately with said plurality of substrates therealong.

8. The method of claim 1 wherein said providing of said counter plates comprises mounting said plurality of counter plates separate from said shaft.

9. The method of claim 1 including rotating said shaft.

* * * * *

UNITED STATES PATENT AND TRADEMARK OFFICE
CERTIFICATE OF CORRECTION

PATENT NO. : 4,764,259

DATED : August 16, 1988

INVENTOR(S) : Itou et al

It is certified that error appears in the above-identified patent and that said Letters Patent is hereby corrected as shown below:

```
Column 2, line 5, "medium" should read --material--.
Column 3, line 11, "small" should read --smaller--.
Column 4, line 19, "enought" should read --enough--.
Column 5, line 12, "small" should read --smaller--.
Column 6, line 9, "or" should read --of--.
```

Signed and Sealed this

Fourteenth Day of March, 1989

Attest:

DONALD J. QUIGG

*Attesting Officer*　　　*Commissioner of Patents and Trademarks*